United States Patent
Regef et al.

(10) Patent No.: US 12,366,501 B2
(45) Date of Patent: Jul. 22, 2025

(54) LEAK DETECTION METHOD AND SYSTEM

(71) Applicant: ATEQ, Les Clayes-sous-Bois (FR)

(72) Inventors: Jean-Luc Regef, Les Clayes-sous-Bois (FR); Patrick Serra, Les Clayes-sous-Bois (FR); Christophe Lemartinel, Les Clayes-sous-Bois (FR); Brian Donald Bright, London (CA)

(73) Assignee: ATEQ, Les Clayes-sous-Bois (FR)

( * ) Notice: Subject to any disclaimer, the term of this patent is extended or adjusted under 35 U.S.C. 154(b) by 0 days.

(21) Appl. No.: 18/013,488

(22) PCT Filed: Jun. 29, 2021

(86) PCT No.: PCT/EP2021/067770
§ 371 (c)(1),
(2) Date: Dec. 28, 2022

(87) PCT Pub. No.: WO2022/002890
PCT Pub. Date: Jan. 6, 2022

(65) Prior Publication Data
US 2023/0280233 A1    Sep. 7, 2023

(30) Foreign Application Priority Data

Jun. 29, 2020 (FR) .................................. 2006778
Jul. 31, 2020 (FR) .................................. 2008152

(51) Int. Cl.
*G01M 3/32* (2006.01)
*H01M 10/42* (2006.01)

(52) U.S. Cl.
CPC ........ *G01M 3/3263* (2013.01); *G01M 3/3272* (2013.01); *H01M 10/4228* (2013.01); *H01M 2220/20* (2013.01)

(58) Field of Classification Search
CPC ............ G01M 3/3263; G01M 3/3272; H01M 10/4228; H01M 2220/20; Y02E 60/10
See application file for complete search history.

(56) References Cited

U.S. PATENT DOCUMENTS

2014/0230526 A1\* 8/2014 Willemin ............... G04B 37/02
                                                                    73/49.3
2018/0328812 A1   11/2018 Fukushima et al.
2019/0003917 A1    1/2019 Goebel et al.

FOREIGN PATENT DOCUMENTS

DE      10258017 A1    6/2004
EP        401447 A  * 12/1990  .......... G01M 3/3236
(Continued)

OTHER PUBLICATIONS

EP0401447 English translation. (Year: 1989).*

*Primary Examiner* — Xin Y Zhong
(74) *Attorney, Agent, or Firm* — Dierker & Kavanaugh, P.C.

(57) ABSTRACT

The present invention relates to a leak detection system for checking the leak-tightness of an object, the system including: a device for pressurising a space; a first pressure sensor configured to measure the variations in pressure of the pressurised space; a second pressure sensor configured to measure the variations in ambient pressure, such as atmospheric pressure; an electronic entity configured to determine a leak depending on the variations in the pressure $\Delta P$ in the pressurised space and the variations in the ambient pressure $\Delta P_{ext}$, the variations $\Delta P$, $\Delta P_{ext}$ being measured over a predetermined test time interval $t_{test}$ by the first and second sensors, respectively.

9 Claims, 7 Drawing Sheets

(56) References Cited

FOREIGN PATENT DOCUMENTS

Figure 1:
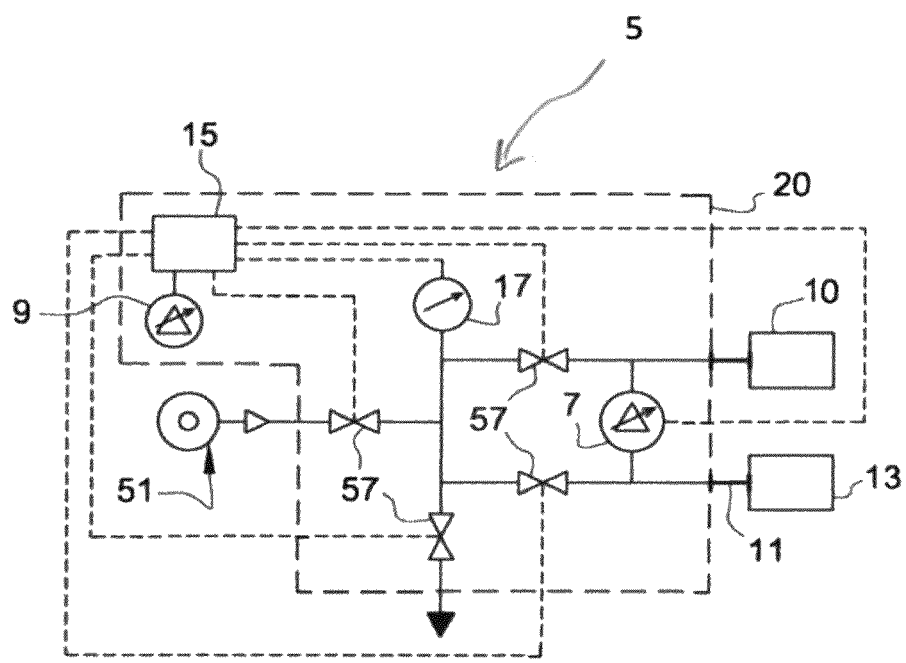

| | | |
|---|---|---|
| EP | 2770380 A1 | 8/2014 |
| FR | 2628529 A1 | 9/1989 |
| FR | 3068468 A1 | 1/2019 |

* cited by examiner

LEAK DETECTION METHOD AND SYSTEM

The present invention relates to the field of leak detection systems and methods for checking the tightness of an object, more particularly based on the measurement of a physical quantity relating to a level of leak.

There are various systems and methods for detecting leaks, but in this case, the invention relates more particularly to leak detection by pressure variation. When it is desired to detect a leak by pressure variation, the object to be tested, so whose level of tightness is to be checked, undergoes a controlled pressure variation, that is, a known pressure variation is applied to an internal space of the object (called the direct method) or to a closed space surrounding said object (called the indirect method). Then, after a certain time, the pressure in the space that has undergone said pressure variation is measured again. If the object has a leak, then the measured pressure is different from the initial pressure.

A pressure variation is generally measured for a given time to allow the determination of a level of leak relating to the object. Indeed, the pressure variation per unit of time can be related to a level of leak by the following mathematical relationship:

$$F = k \frac{\Delta P}{\Delta t} V$$

in which, F is the leak generally expressed in cubic centimetres per minute (or cm$^3$/min), $\Delta P$ is the pressure variation in Pascal (Pa) measured in the space, $\Delta t$ is the time interval (in seconds) of the measured pressure variation $\Delta P$, V is the relevant space to be considered (for example the internal space of the object) generally expressed in cubic centimetres (cm$^3$), and k is a multiplying constant (in Pa$^{-1}$).

Thus, regardless of the object or a sub-element of the object, it is possible to check the latter for leaks and determine its level of tightness.

The object to be tested may be an electronic device, a package, a container, etc. The tolerances on the level of tightness can therefore be highly variable with regard to the object to be tested, its space, its shape, its function, etc.

However, when the level of leak to be determined is relatively small compared to the space of the object to be tested, the environmental parameters can make it difficult to measure the pressure variation and/or its repeatability.

Indeed, the value of the pressure variation relating to the leak then has an order of magnitude close to the pressure variations of the environment (generally atmospheric pressure), and it is therefore particularly difficult to obtain reliable leak measurements and to distinguish a pressure variation related to a leak from a variation related to the environment.

This problem is all the more pronounced when leak detection is performed in a factory, that is, in an industrial environment where temperature and pressure may vary locally and/or over time depending on the operations carried out on the objects to be tested or in the vicinity of said leak detection system.

The present invention finds advantageous application in the field of leak detection for electric batteries for automobile electric vehicles, but also for any object with similar problems.

Indeed, an automotive electric battery is thus generally comprised of several modules housed in a casing which is equipped with a cooling system, an electronic management card, etc.

This type of battery can have a large space, in the order of 100 to 150 litres (or cubic decimetres), and has to meet strict tightness criteria, as the presence of water in such an object can be catastrophic. The level of leak of a battery therefore has to be small and checking of such leaks is therefore performed in an order of magnitude close to the temperature variations and/or pressure of the battery's environment. In addition, batteries are electrically and mechanically tested before they are installed in a vehicle. Batteries therefore undergo thermal and mechanical stresses that can affect a subsequent tightness checking.

Research and tests have therefore been carried out by the patent holder to provide a leak detection method and system with improved sensitivity and enabling better repeatability in leak detection, while improving the level of detectability of said leaks.

The invention is thus a new leak detection system for checking the tightness of an object, said system comprising:
- a device for pressurising a space;
- a first pressure sensor configured to measure pressure variations in the pressurised space; and
- a second pressure sensor configured to measure pressure variations of the environment, such as atmospheric pressure; and
- an electronic entity configured to determine a leak F', F" depending on the pressure variations $\Delta P$ in the pressurised space and the pressure variations $\Delta P_{ext}$ of the environment, said variations $\Delta P$, $\Delta P_{ext}$ being measured over a predetermined test time interval $t_{test}$, respectively by the first and second sensors.

According to a possible characteristic, the pressure variations $\Delta P$ in said space are corrected according to the pressure variations $\Delta P_{ext}$ of the environment. The correction of the pressure variations of said space make it possible to obtain a leak value that approaches the real value of the leak of the tested object.

According to another possible characteristic, the first and/or second pressure sensors are differential pressure sensors.

The use of differential pressure sensors has the advantages of being able to measure smaller pressure variations and to eliminate measurement errors related to the mechanical and/or thermal behaviour of the tested object.

According to another possible characteristic, the electronic entity and said first and second sensors make it possible to generate, over the test time interval $t_{test}$:
- a curve of the pressure variations $\Delta P$ in said space;
- a curve of the pressure variations $\Delta P_{ext}$ of the environment.

According to another possible characteristic, the electronic entity (15) determines the level of leak F' of the tested object based on a corrected pressure variation $\Delta P'$, said corrected pressure variation $\Delta P'$ being calculated as follows:

$$F' = C_1 \Delta P' = C1(\Delta P - k_S \Delta P_{ext})$$

where $k_S$ is a normalisation coefficient specific to the first and second sensors and $C_1$ is a constant depending on the time and space of the tested object.

According to another possible characteristic, the normalisation coefficient $k_S$ is determined based on the curve of the pressure variations $\Delta P$ in said space and the curve of the pressure variations $\Delta P_{ext}$ of the environment, or prior to said measurement of the pressure variation $\Delta P$ in said space and the measurement of the pressure variation $\Delta P_{ext}$ of the environment, the value of the normalisation coefficient $k_S$ being stored in a memory of the electronic entity.

According to another possible characteristic, the system comprises a third pressure sensor configured to measure the pressure in the pressurised space. According to one aspect, the third sensor may for example be an absolute pressure sensor.

According to another possible characteristic, said electronic entity determines an average temperature variation per unit of time of the object via at least one sensor, said average temperature variation being also used to determine the leak so depending on the pressure variations in the pressurised space and the pressure variations of the environment.

Indeed, if the tested object is not in thermal equilibrium with its environment, the fact that it senses or transfers heat changes the temperature of the space and thus varies the pressure in said space.

According to another possible characteristic, the electronic entity is configured to determine, via the second or third sensor, the average temperature variation of the pressurised space and/or the tested object.

According to another possible characteristic, said electronic entity determines, via at least one sensor, a pressure variation $\Delta_T P$ related to the average temperature variation of the object per unit of time, said pressure variation $\Delta_T P$ being also used to determine the leak F" of the tested object depending on the pressure variations $\Delta P$ in the pressurised space and the pressure variations $\Delta P_{ext}$ of the environment.

According to another possible characteristic, the electronic entity determines the level of leak F" of the tested object depending on the following formula:

$$F''=C_1\Delta P''=C_1(\Delta P-k_S\Delta P_{ext}-\Delta_T P)$$

where $\Delta P''$ is the corrected pressure variation of the tested object, $\Delta_T P$ is the pressure variation depending on the average temperature variation of the tested object during the test time of said object, and $C_1$ is a constant depending on the time and space of the tested object.

According to another possible characteristic, the system comprises a thermally insulated enclosure configured to accommodate the object to be tested.

According to another possible characteristic, the thermally insulated enclosure is made of a material having a thermal conductivity of less than 0.05 W·m$^{-1}$·K$^{-1}$ at 20° C., preferably less than 0.03 W·m$^{-1}$·K$^{-1}$ at 20° C., and even more advantageously less than 0.01 W·m$^{-1}$·K$^{-1}$ at 20° C.

According to another possible characteristic, said enclosure accommodating the object to be tested comprises one or more cavities capable of accommodating the object to be tested and a reference object.

According to another possible characteristic, the system comprises a ventilation device configured to stir the gas, preferably inert, or air of the internal space of the enclosure.

Said ventilation device makes it possible in particular to avoid the creation of hot spots and/or thermal bridges between the enclosure(s) and the outside of the detection device.

The invention also relates to a leak detection method for object tightness checking, said method being implemented within a leak detection system (1), and comprising the following steps:
    pressurising a space by a pressurising device;
    measuring the pressure variation of the pressurised space by a first pressure sensor;
    measuring the pressure variations of the environment by a second sensor;
    determining and detecting a leak depending on the pressure variations of the pressurised space and the pressure variations of the environment.

Figure 1A:
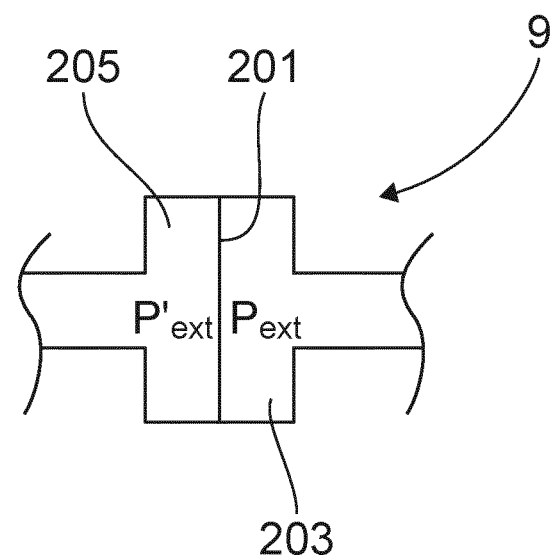
Figure 2:
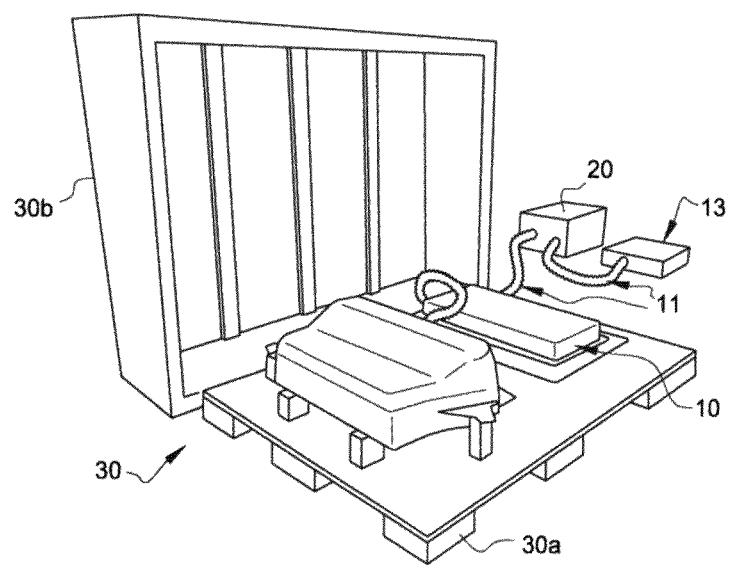
Figure 3:
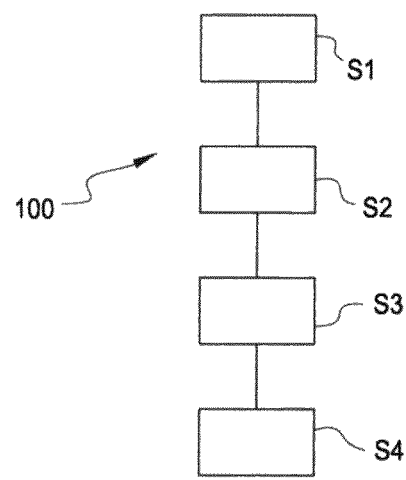
Figure 4:
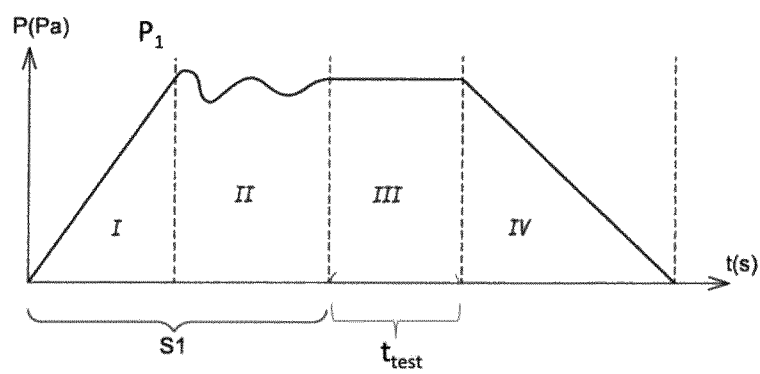
Figure 5:
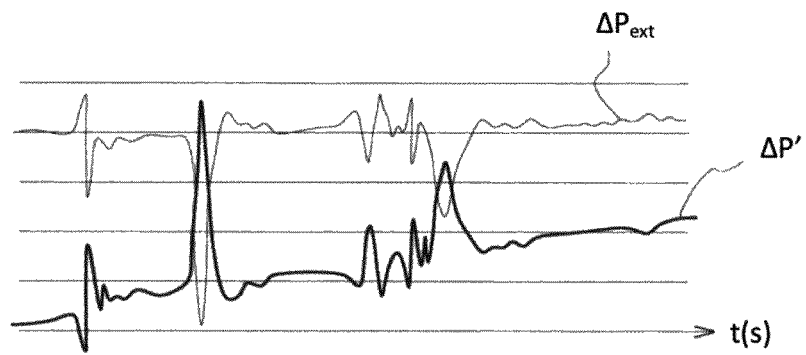
Figure 6:
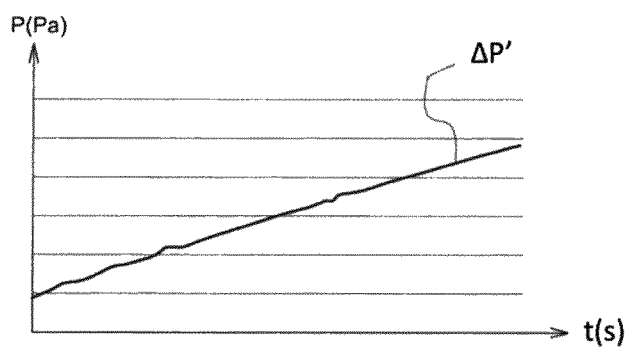

The invention will be better understood, and further purposes, details, characteristics and advantages thereof will become clearer throughout the following description of particular embodiments of the invention, given by way of illustration only and not limitation, with reference to the appended drawings, in which:

FIG. 1, referred to as [FIG. 1], is a highly schematic representation of a leak detection system according to the invention;

FIG. 1a, referred to as [FIG. 1a], which is a schematic and enlarged view of a pressure sensor of the system of FIG. 1;

FIG. 2, referred to as [FIG. 2], is a schematic perspective view of the system of FIG. 1 for checking the tightness of an object, when the object is an electric battery for an electric automobile vehicle;

FIG. 3, referred to as [FIG. 3], is a flow chart representing the steps of the leak detection method according to the invention;

FIG. 4, referred to as [FIG. 4], is a graph of the pressure variation in the space during different steps of the method of FIG. 3;

FIG. 5, referred to as [FIG. 5], is a graph representing, as curves, an example of pressure variations in a space relating to the tested object and to the environment during a tightness checking of the object;

FIG. 6, referred to as [FIG. 6], is a curve of the pressure variation in a space relating to the tested object determined from the curves in FIG. 5.

FIG. 1 is thus a highly schematic representation of a leak detection system for checking the tightness of an object 10, in the example described below the tested object is an electric battery for an automobile vehicle, but can be any object whose tightness has to be checked and whose level of leak that is to be detected is in the order of magnitude of the disturbances related to the environment of said system.

Said system thus comprises:
    a device 5 for pressurising a space relating to the tested object 10, such as the characteristic space of the electric battery 10, that is, this may be an internal space of the battery (direct method) or a closed space surrounding the battery (indirect method);
    a first pressure sensor 7 configured to measure the pressure variations of said characteristic space for checking the tightness of the battery 10;
    a second pressure sensor 9 configured to measure the pressure variations of the environment, typically atmospheric pressure;
    a third pressure sensor 17, which is an optional sensor, configured to measure the pressure applied in said characteristic space by said device 5;
    aeraulic connections 11 configured to connect the pressurising device 5 to the object 10 and to a reference 13;
    an electronic entity 15, such as an electronic circuit, connected to the various pressure sensors 7, 9, 17 and configured to recover the pressure values measured by one or more of said sensors 7, 9 and 17.

The first and second pressure sensors 7 and 9 are preferably differential pressure sensors. Whereas the third sensor 17 is advantageously an absolute pressure sensor.

It will be noted that a differential pressure sensor is for example a sensor including a diaphragm where each face of the diaphragm is exposed to a pressure, the displacement of the diaphragm (measured for example by capacitive effect) enabling the pressure difference of each face of the diaphragm to be measured.

[FIG. 1a] is a highly schematic view of the second differential pressure sensor 9 configured to measure the pressure variations of the environment, such as atmospheric pressure.

More particularly, the sensor 9 comprises a diaphragm 201 with each face located in a separate cavity 203, 205. Each of the cavities 203, 205 of the sensor 9 communicates with the outside (in this case the atmosphere), however one of the cavities 205 is configured to filter out rapid pressure variations that may occur in that environment, thus pressure values $P_{ext}$ and $P'_{ext}$ prevailing in each of the cavities 203, 206 can be defined, the difference of which provides pressure variations $\Delta P_{ext}$ of the environment.

Similarly, in the present example, the leak detection is done by means of a reference 13, but the latter can be:
- a reference piece (that is, the same object having the required level of tightness), in which case the measurement of a pressure variation is performed between a test piece and a reference piece;
- a plug, the measurement of a pressure variation between a test piece and a reference side plug;
- another similar object to be tested, thus two pieces are tested at the same time, one at the test side, the other at the reference side.

More particularly, the device 5 comprises:
- a compressed air supply 51;
- an aeraulic circuit including a plurality of valves 57 and which is, on the one hand, connected to the supply 51 and, on the other hand, is configured to regulate the supply of compressed air to the various parts of the aeraulic circuit, that is, to at least one of said sensors 7, 17 and/or at least one characteristic space of the object 10 to be tested and of the reference 13 (via the aeraulic connections 11).

Generally, the device 5 and its elements 51, 57, the electronic entity 15, as well as the various sensors 7, 9 and 17 are arranged inside a casing 20. However, the various elements, such as the sensor 9, can be offset and arranged outside the casing 20.

Said electronic entity 15 is also connected to said valves 57, in order to control said valves 57 during the various steps necessary for checking the tightness of the object 10.

As for [FIG. 2], it is a schematic perspective view of the system of [FIG. 1] used for checking the tightness of an electric battery 10.

Thus, said system 1 furthermore comprises an enclosure 30 comprising a base 30a and a cover 30b. The base 30a is configured to accommodate the battery 10 and the cover 30b to cover said battery 10 in order to limit environmental influences when detecting leaks.

For this, said enclosure 30 may be made of a material having a thermal conductivity of less than 0.05 W·m⁻¹·K⁻¹ at 20° C., preferably less than 0.03 W·m⁻¹·K⁻¹ at 20° C., and even more advantageously less than 0.01 W·m⁻¹·K⁻¹ at 20° C.

In an alternative embodiment not represented, said enclosure 30 comprises one or more cavities capable of accommodating the object to be tested 10 and the reference 13.

In another alternative embodiment not represented, the system 1 comprises a ventilation device configured to stir the gas, preferably inert, or air of the internal space of the enclosure 30.

Thus, as illustrated in [FIG. 3], when it is desired to check the tightness of an object 10, such as a battery, said system 1 performs the following method 100:
- pressurising S1 a characteristic space of the object 10, for example the internal space of the battery, via the pressurising device 5;
- measuring the pressure variation S2 of the pressurised space of the object 10 by the first pressure sensor 7;
- measuring the pressure variations of the environment S3 by the second sensor 9;
- detecting a leak S4 depending on the pressure variations of the pressurised space $\Delta P$ and the pressure variations of the environment $\phi P_{ext}$ (in this case the atmospheric pressure).

It will be noted that some of the steps of the method 100 are part of an aeraulic leak detection management method that can be divided into four phases, more particularly illustrated in [FIG. 4]:
- a phase of filling I the space with compressed air, the pressure increases to a desired pressure value P1;
- a stabilisation stage II, after having pressurised the space, waiting for it to return to thermal and mechanical equilibrium, so that phenomena do not disturb the measurement of the leak, it should be noted that the filling and stabilisation phases I and II correspond to the pressurisation step S1;
- a test phase III, during which the pressure variations in the pressurised space and the pressure variations of the environment are measured for a predetermined test time $t_{test}$ (the test phase III thus corresponds to steps S2 and S3 above);
- a draining phase IV, during which the pressurised space is returned to atmospheric pressure.

The various steps and phases described below are controlled by the electronic entity 15 which manages the opening and closing of the various valves 57 accordingly.

Additionally, said electronic entity 15 is configured to determine a leak F' and F'" depending on the pressure variations in the pressurised space $\Delta P$ and the pressure variations of the environment $\phi P_{ext}$, said variations $\Delta P$, $\phi P_{ext}$ being measured, over a predetermined time interval $t_{test}$, by the first and second sensors 7 and 9.

FIG. 5 illustrates an example of pressure values measured by the first and second sensors 7 and 9, as curves. There is a curve illustrating the variation in the pressurised space $\Delta P$ and another curve illustrating the pressure variation of the environment $\Delta P_{ext}$ over the test time $t_{test}$. Said curves are generated via the electronic entity and the first and second sensors 7 and 9.

The electronic entity 15 is thus configured to correct the curve $\Delta P$ by the curve $\Delta P_{ext}$, in order to obtain a corrected pressure variation $\Delta P'$ which is no longer influenced by the environment (pressure and/or temperature variations from the environment).

More particularly, said corrected pressure variation $\Delta P'$ is calculated as follows:

$$\Delta P' = (\Delta P - k_S \Delta P_{ext})$$

where $k_S$ is a normalisation coefficient specific to the sensors 7 and 9 allowing the values of each of the curves to be subtracted from each other.

An example of a corrected pressure curve $\Delta P'$ based on the curves in [FIG. 5] is illustrated in [FIG. 6].

Said normalisation coefficient $k_S$ is for example:
- determined based on the measurement curves $\Delta P$, $\Delta P_{ext}$, for example by making the ratio of extreme values;

determined beforehand and its value is stored in a memory of the electronic entity 15.

Thus, the electronic unit 15 determines the level of leak F', also called corrected level of leak, from the corrected pressure variations ΔP' according to the following formula:

$$F' = k\frac{\Delta P'}{\Delta t}V = C_1 \Delta P'$$

where $C_1$ is a constant depending on the time (for example the test time $t_{test}$) and the space V of the tested object (that is, the space of the object whose tightness is to be determined).

Depending on the value of the leak F', and according to the required threshold, the electronic entity 15 indicates the compliance or not of the tested object.

In an alternative embodiment, said electronic entity 15 determines an average temperature variation per unit of time of the tested object, via at least one sensor, for example the second or third sensor 9, 17.

Said average temperature variation is then used to determine a corrected leak F" depending on the pressure variations ΔP measured in the pressurised space and the pressure variations $\Delta P_{ext}$ of the environment.

More particularly, in a step prior to the test, the second 9 or third 17 sensor is configured to measure a pressure variation $\Delta_T P$ (in Pa/s) depending on the average temperature variation of the object per unit of time.

This measurement can for example be carried out during a step prior to filling or during the stabilisation phase, but it is necessary that the object to be tested and/or the reference are isolated from the outside.

The electronic entity 15 then determines a corrected pressure variation in ΔP" of the characteristic space of the tested object depending on the following formula:

$$\Delta P'' = \Delta P - k_S \Delta P_{ext} - \Delta_T P$$

Then, as previously, the electronic entity 15 calculates a corrected level of leak F" based on ΔP" according to the previous equation.

The invention claimed is:

1. A leak detection system for checking the tightness of an object, said system comprising:
    a device for pressurising a space;
    a first pressure sensor configured to measure pressure variations of the pressurised space;
    a second pressure sensor configured to measure pressure variations of atmospheric pressure;
    an electronic entity configured to determine a leak F' depending on the pressure variations ΔP in the pressurised space and the pressure variations $\Delta P_{ext}$ of said atmospheric pressure, said variations ΔP, $\Delta P_{ext}$ being measured over a predetermined test time interval $t_{test}$, respectively by the first and second pressure sensors,
    wherein the electronic entity determines a level of the leak F' of the tested object based on a corrected pressure variation ΔP', said corrected pressure variation ΔP' being calculated as follows:

$$F' = C_1 \Delta P' = C1(\Delta P - k_S \Delta P_{ext})$$

wherein ks is a normalisation coefficient specific to said first and second pressure sensors, and $C_1$ is a constant depending on the time and space of the tested object, said normalisation coefficient ks being determined:
    based on a curve of the pressure variations ΔP in said space and a curve of the pressure variations $\Delta P_{ext}$ of said atmospheric pressure, or
    prior to said measurement of the pressure variation ΔP in said space and the measurement of the pressure variation $\Delta P_{ext}$ of said atmospheric pressure, the value of said normalisation coefficient ks being stored in a memory of the electronic entity.

2. The system according to claim 1, wherein said pressure variations ΔP in said space are corrected depending on said pressure variations $\Delta P_{ext}$ of said atmospheric pressure.

3. The system according to claim 1, wherein the first pressure sensor and/or the second pressure sensor are differential pressure sensors.

4. The system according to claim 1, the electronic entity and said first and second sensors making it possible to generate, over the test time interval $t_{test}$:
    the curve of the pressure variations ΔP in said space; and
    the curve of the pressure variations $\Delta P_{ext}$ of said atmospheric pressure.

5. The system according to claim 1, further comprising a third pressure sensor configured to measure a pressure P in the pressurised space.

6. The system according to claim 5, wherein said electronic entity determines, through at least one sensor, a pressure variation $\Delta_T P$ related to an average temperature variation of the object per unit of time, said pressure variation $\Delta_T P$ being also used to determine a leak F" of the tested object depending on the pressure variations ΔP in the pressurised space and the pressure variations $\Delta P_{ext}$ of said atmospheric pressure.

7. The system according to claim 6, wherein the electronic entity is to determine a level of the leak F" of the tested object depending on the following formula:

$$F'' = C_1 \Delta P'' = C_1(\Delta P - k_S \Delta P_{ext} - \Delta_T P)$$

wherein ΔP" is the corrected pressure variation of the tested object, $\Delta_T P$ is the pressure variation depending on the average temperature variation of the tested object during the test time interval of said object, and $C_1$ is a constant depending on the time and space of the tested object.

8. The system according to claim 1, further comprising a thermally insulated enclosure configured to accommodate the object to be tested.

9. A leak detection method implemented within a leak detection system according to claim 1, said method comprising the following steps:
    pressurising the space by the device for pressurising the space;
    measuring the pressure variation of the pressurised space by the first pressure sensor;
    measuring the pressure variations of said atmospheric pressure by a second sensor; and
    detecting a leak depending on the pressure variations of the pressurised space ΔP and the pressure variations $\Delta P_{ext}$ of said atmospheric pressure.

* * * * *